Aug. 23, 1966 N. K. MOSES 3,268,170
INSULATING RUBBER RAIL SEAT
Filed June 19, 1964 3 Sheets-Sheet 1
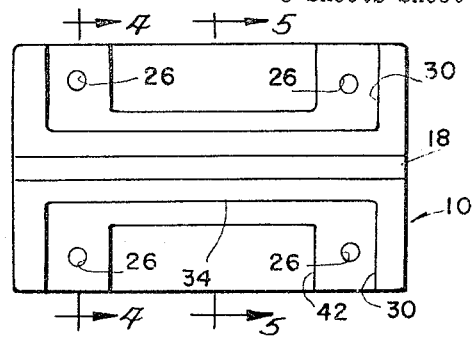
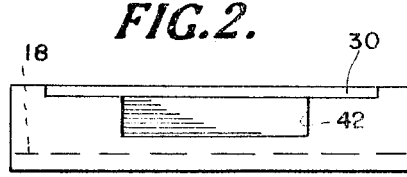
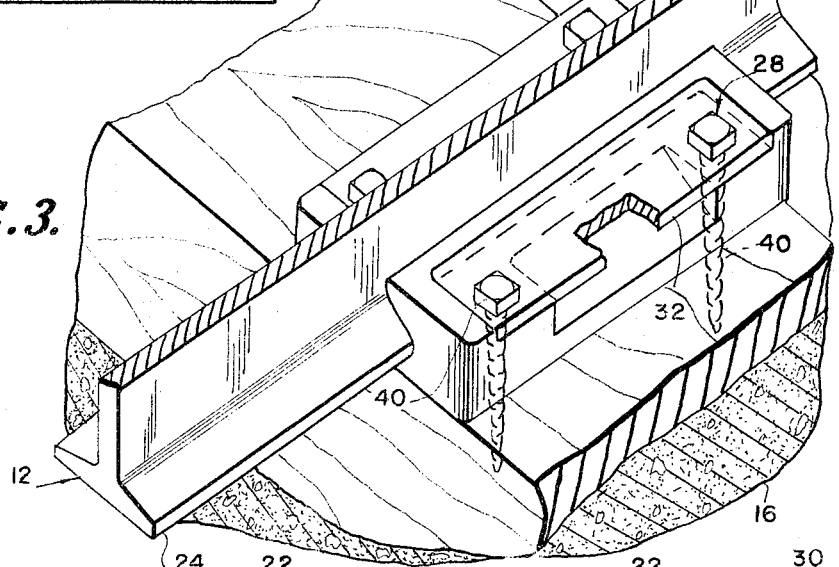
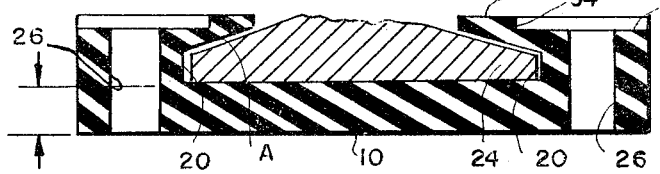
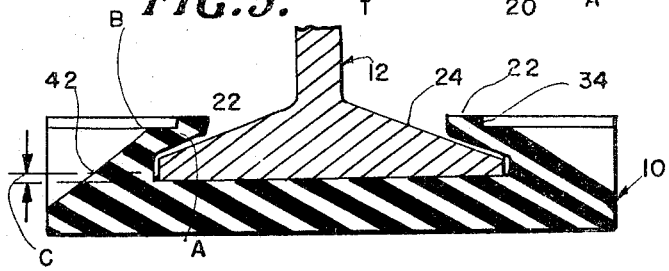
INVENTOR
NELSON K. MOSES
BY Cushman, Darby & Cushman
ATTORNEYS

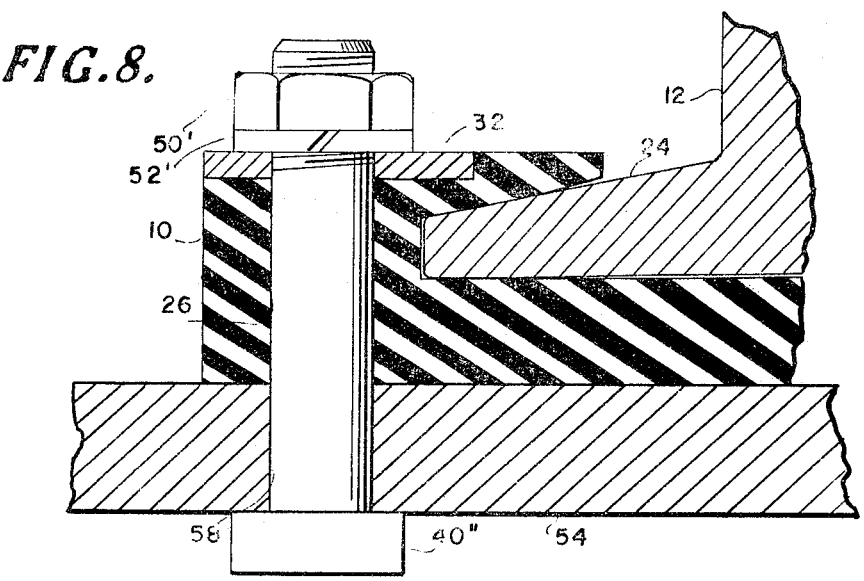
FIG. 8.
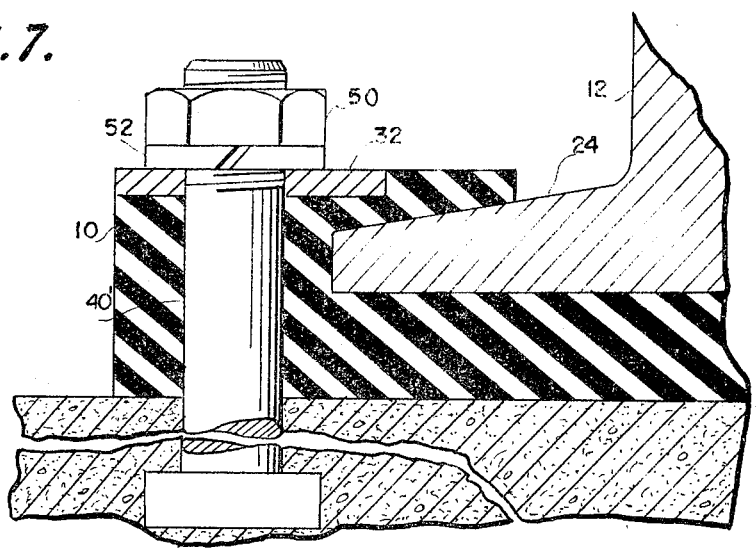
FIG. 7.
FIG. 6.
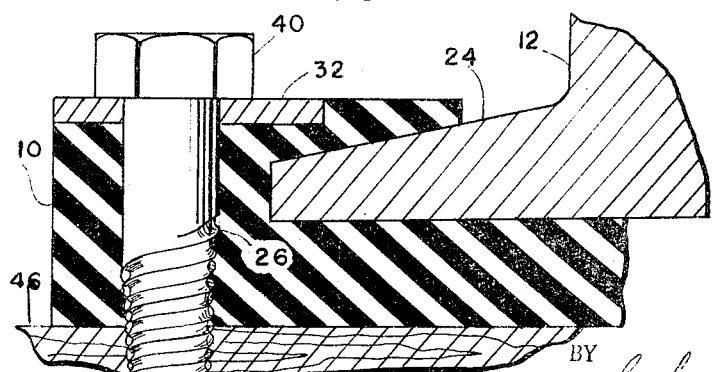
INVENTOR
NELSON K. MOSES

INVENTOR
NELSON K. MOSES

United States Patent Office 3,268,170
Patented August 23, 1966

3,268,170
INSULATING RUBBER RAIL SEAT
Nelson K. Moses, Ashtabula, Ohio, assignor to Railroad Rubber Products, Inc., Ashtabula, Ohio, a corporation of Florida
Filed June 19, 1964, Ser. No. 377,462
21 Claims. (Cl. 238—283)

The present invention relates to an improved track structure for railroads or the like and, more particularly, to a track structure wherein the traction rails are insulated from the track-supporting structure.

This application is a continuation-in-part of my application Serial No. 93,979, filed March 7, 1961, and now abandoned.

For many years it has been the standard practice to support traction rails by mounting them upon wooden crossties with steel tie plates being placed between the wooden crossties and the rails. In these structures, spikes passing through holes in the tie plates into the wood ties, with the head of the spikes bearing against the base flange of the rails, hold the rails upon the ties. Oftentimes mechanical rail anchors have been added to the track structure in an effort to prevent longitudinal creeping of the rails caused by dynamic loads imposed thereon by rolling stock.

In my prior United States Patent No. 2,094,279, entitled "Rubber and Rail Seat" patented September 28, 1937, and in my United States Patent No. 2,996,256, entitled "Traction Rail Anchors," dated August 15, 1961, and issued from my application Serial No. 307,078, filed August 29, 1952, which application is in copendency with my said application Serial No. 93,979, there are disclosed rail seats for supporting the rails on ties or the like. The rail seats include rubber pads placed between the rails and the ties, and also between the rails and the tie plates and the tie plates and ties. Such rail seats cushion the impact loads and reduce the severe and destructive wear on the tie plates and/or ties. The present invention contemplates the provision of an improved resilient rail seat which will not only serve to cushion impact loads of the rolling stock and increase longevity of the track structure but will further insulate the rail from the track-supporting structure against a potential of 40,000 volts or higher potential, if desired. The improved insulating rail seat of the present invention, while it may be used with wooden crossties, in many cases eliminates the use of wooden crossties, and/or steel tie plates, and prevents electrolysis and corrosion between the component parts of the track structure.

In electric railway systems and on electronic scale platforms, it is necessary to fully insulate the rails from their support. While wood is a non-insulator, there are many shortcomings in using wooden ties in electrical installations. For example, there can be conduction of electricity through the spikes and through the accumulation of electrically conducting material on the ties to the ground. Consequently, while the present improved insulating rail seat is primarily intended for use in installations where the track supporting structure is concrete or steel decking, it has additional utility in those installations where wooden ties are used when it is desired to provide a rail which is completely insulated from the track-supporting structure.

Accordingly, an object of the present invention is to provide an improved track structure wherein the traction rails are insulated from their supporting structure.

Another object of the present invention is to provide an improved insulating rail seat capable of cushioning impact loads caused by the rolling stock, eliminating creeping of the rails, and insulating the rails from the rail-supporting structure.

A further object of the present invention is to provide an insulating rail seat which eliminates the necessity of tie plates and prevents deterioration caused by corrosion and electrolytic action.

Still another object of the present invention is to provide an improved insulating rail seat which has longer life, is easy to install between the base flange of the rail and the track supporting structure and which has the insulating material of formation therein in a relaxed position when installed so as not to set up any stresses which would tend to increase the propagation of cracks or tears in the same, if such cracks or tears should be caused by wear.

Ancillary to the preceding object, it is a further object of the present invention to provide an improved resilient insulating rail seat which does not have the tendency to tear or crack after continued use and exposure to the elements.

Another object of the present invention is to provide a resilient insulating rail seat which prevents electric current flashover between the rail and the spikes or bolts holding the rail to the rail-supporting structure.

A further object of this invention is to provide a preformed resilient pad for supporting a traction rail on a supporting structure wherein the resilient pad is formed from an elastomeric material; wherein the pad has a rail base flange receiving cavity in its upper surface for receiving the base flange of a rail, the flange receiving cavity being defined by lips on the pad that overlie the base flange of the rail; wherein the pad is adapted to receive a bearing plate on each of the lips such that the bearing plate will overlie a portion of the rail base flange and the marginal outer edge portion of the pad; and wherein the pad is further adapted to receive securing means which will extend through each of the bearing plates and the pad in spaced relationship to the outer extremities of said cavity in its region of greatest width such that the securing means will bear against the bearing plate and anchor the pad and the rail to the supporting structure, the lips on the pad permitting the bearing plate to apply a continuous line of pressure on the rail base flange.

These and other objects and advantages of the present invention will appear more fully in the following specification, claims and drawings in which:

FIGURE 1 illustrates a top plan view of the improved insulating rail seat of the present invention;

FIGURE 2 illstrates an end elevational view of the rail seat shown in FIGURE 1;

FIGURE 3 is a perspective view partly in cross-section illustrating the rail seat of FIGURE 1 utilized with a track-supporting structure including a wooden tie;

FIGURE 4 is an enlarged sectional view taken substantially on the line 4—4 of FIGURE 1 and showing a base flange of a rail in position within the rail cavity of the rail seat;

FIGURE 5 is a view similar to FIGURE 4 but taken on the line 5—5 of FIGURE 1;

FIGURE 6 is a fragmentary sectional view illustrating one means of anchoring the insulating rail seat of the invention to a track-supporting structure made of concrete or the like;

FIGURE 7 is a fragmentary sectional view similar to FIGURE 6 but illustrating a modified form of securing means;

FIGURE 8 is another sectional view, similar to FIGURE 6, but showing still another modified form of securing means for securing the rail seat to a steel deck or the like;

Figure 9:
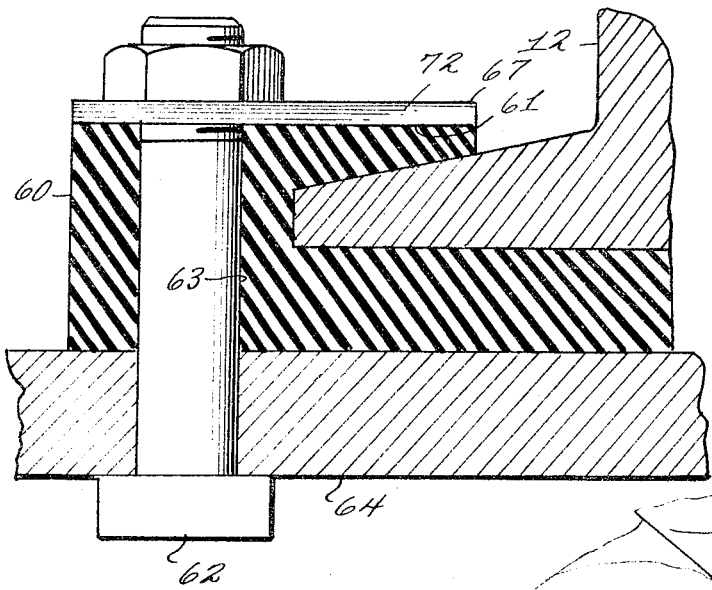
FIGURE 9 is another fragmentary sectional view, similar to FIGURE 8, but showing another embodiment of the rail seat according to the invention.

Referring to the drawings wherein like characters or reference numerals represent like or similar parts, the preformed molded resilient pad generally designated by the numeral 10 for providing an insulating rail seat is best illustrated in FIGURES 1 to 3, inclusive. Since in a preferred use, the pad 10 will insulate the rail 12 from ground in such installations as an electrical railway system which, as an example, normally utilize 25,000 volts, the pad should desirably be capable of insulating against a 40,000 volt potential as a margin of safety must be provided. The pad 10 may also be employed to good advantage in non-electrical railway systems, as will be appreciated hereinafter.

In the preferred use, the material of the pad 10 must serve three functions, namely, it must insulate the rail from ground, second, it must provide a cushion to absorb impact loads of the railway rolling stock, and third, it must prevent the rail from creeping longitudinally due to the wave action set up in the rails by the rolling stock. These latter two features make the pad suitable for substantially all railway systems. To provide the above three functions, it has been found that the pad 10 must contain as a primary ingredient natural rubber which has a high dielectric strength. The pure natural rubber used for the pads 10 may include the usual fillers, accelerators, catalysts, etc., which are employed in the manufacture thereof. In order that the pad may have resistance to deterioration from oil, grease, weather or the like, a secondary ingredient of neoprene is added to the natural rubber. It has been found that a pad 10 constructed according to the present invention and having a composition of approximately 70% natural rubber and 30% neoprene produces the best results over a wide range of conditions including temperature variation, inclement weather, corrosive liquids, and deterioration from oil, grease or the like. Such a pad from the above-mentioned material accomplishes the functions for which the pad is subjected, namely, the provision of an insulating rail seat, means to absorb and cushion impact loads, and means to prevent creeping of the rails.

Referring now to FIGURES 1 through 3, it will be noted that the pad 10 is illustrated mounted on a crosstie 14 supported in a concrete bed 16 or the like. The crosstie 14 and concrete bed 16 define a track foundation or supporting structure. The pad 10 supports the rail above the crosstie 14 and also above the top surface of the concrete bed 16. The track supporting structure illustrated in FIGURE 3 is one typical form of supporting rails 12 for electric railway systems or the like, and other forms of track supporting structure wherein the novel pad structure 10 is used will be described later in the specification. In the track supporting structure illustrated in FIGURE 3, it will be understood that the wooden crossties 14 in themselves are an insulating material but that the concrete in which the ties are embedded is a conductor, due to the usual materials of formation. It has been found that even though the wooden ties 14 are an insulator as such, without the pad 10, certain conditions arise wherein there can be a short to ground from the rail 12 over the ties 14. The short to ground may occur due to an accumulation of electrical conducting particles such as dust, dirt or the like on the ties. While such condition is somewhat alleviated where the track structure is in open air, as rainfall, wind or the like will tend to remove the acculation of dust or dirt, the problem remains particularly acute in underground installations such as subway systems.

The pad 10 is preferably rectangular in shape and is provided with a longitudinally extending groove 18 which is formed with undercut longitudinal edge portions 20 (FIGURE 4) so as to define a rail base flange receiving cavity. Since the groove 18 is undercut, as indicated at 20, a pair of lips 22 overlie a portion of the rail base cavity and also overlie a portion of a base flange 24 of rail 12 when the pad is positioned thereon.

The rail base cavity defined by the longitudinally extending groove 18 in the pad 10 has a cross-sectional dimension at least as great as but preferably slightly greater than the complementary cross-sectional dimension of the rail base flange 24 of rail 12. It has been found that by providing a slightly loose fitting for the rail base cavity on the rail base flange 24, it is easier to apply the pad 10 to the flange 24, and also no stresses are set up in the pad 10 especially around the lips 22 after the pad has been applied to the rail. As an example, for normal railway use, by making the cavity at least $\frac{1}{32}$ of an inch deeper in thickness in the area of the lips 22 and in its area of greatest width than the thickness of the rail base flange 24 and its region of greatest width, the pad when assembled onto the rail base flange 24 is relaxed in the area of the lips 22 and along its longitudinal marginal edge portions, and thus shearing action or tearing action of the rubber in the pad is avoided.

As is illustrated in FIGURES 1 and 4, the pad 10 is provided in each longitudinal marginal edge portion with at least a pair of longitudinally spaced vertically extending prepunched holes 26 for receiving securing means generally designated at 28 in FIGURE 3, which securing means may be a bolt, screw spike or lag screw, and the like. The prepunched holes 26 are desirably spaced outwardly of the longitudinal marginal edges of the rail base flange receiving cavity in its region of greatest width by at least $\frac{3}{8}$ of an inch, since by providing at least $\frac{3}{8}$ of an inch of rubber between the bolt-receiving holes 26 and the edge of the rail base flange 24 when the pad 10 is positioned on the rail base flange 24, there can be no breakthrough or leakage of electrical current to the bolt-retaining means 28 under normal electrical railway voltages. Greater or lesser dimensions may be employed where necessary or desirable for other uses.

The prepunched holes 26 in the pad 10 preferably have a diameter slightly smaller than the diameter of the bolt securing means 28 so that when each bolt securing means 28 is urged through the holes to anchor the rail to the supporting structure, the rubber about the holes 26 is extended and a positive pressure is exerted on the bolts by this rubber in the pad and thus any leakage caused by atmospheric action is excluded.

The upper surface of each of the longitudinal marginal edge portions of the pad 10 may be provided, according to one embodiment of this invention, with recesses 30 for receiving a steel bearing plate 32. The recesses 30 have an inner edge 34 parallel to the innermost edge of the lips 22 but spaced outwardly therefrom by a distance sufficient to prevent electrical current flashover between the rail and the steel bearing plate 32. However, it will be noted that a portion of the recess 30 overlies a portion of the rail base cavity and the rail base flange 24 of rail 12 when the pad 10 is assembled onto the base of the rail. For normal electrical railway use, a minimum distance of $\frac{3}{16}$ of an inch of material is provided between the bearing surface of the recesses 30 and the top surface of the rail base flange receiving cavity as indicated at A in FIGURES 4 and 5. When employed, each recess 30 has a depth of from $\frac{3}{16}$ of an inch to $\frac{3}{8}$ of an inch so that the steel bearing plate 32, which has a comparable thickness, may, if desired, be flush with the top surface of the pad 10 and thus electrical current flashover to the steel bearing plate from the rail is eliminated at a voltage lower than 40,000 volts.

Referring now to FIGURE 3, it will be noted that the steel bearing plate 32, which may be complementary in size and shape to the recess 30, extends over both of the securing means receiving holes 26 and has holes therethrough which are aligned with the holes 26 in pad 10. The securing means 28 in this particular embodiment of the invention are lag screws or bolts 40 threaded into the tie 14. By providing the bearing plate 32 which overlies a portion of the rail base receiving cavity in the pad 10 and a portion of the flange 24 of the rail, the pressure area is increased and thus the pressure of the lag screws or bolts 40 on the pad is evenly distributed throughout the pad. Consequently, the heads of the screws or bolts 40 cannot work into the pad in a localized area and cause failure of the pad after continued use. In all embodiments of this invention, bearing plate 32 and particularly the rail base flange side thereof, is preferably of rectangular shape in order to provide, by coaction with the securing means 28, a straight, continuous line of pressure on the rail base flange 24.

Figure 11:
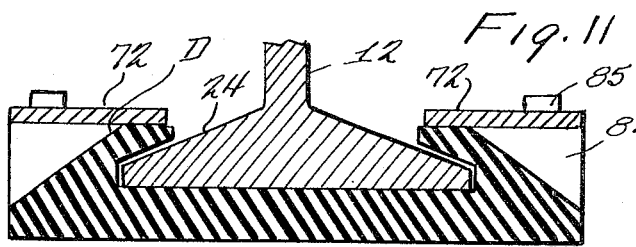
FIGURE 11 is a sectional view semilar to FIGURE 5, but showing still another embodiment of the rail seat according to the invention.

In order to conserve material of the pad and to make the pad easy to assemble onto the rail base flange 24, according to the embodiments of FIGURES 5 and 11, the area of the longitudinal marginal edge portions of the pad 10 between the longitudinally spaced holes 26 may be beveled, as illustrated at 42 in FIGURE 5, and at 82 in FIGURE 11. The bevel 42 terminates at a point indicated at B in FIGURE 5 outwardly of the rail base flange receiving cavity, and at D in FIGURE 11, in either case in the region of greatest width so that there is a bearing surface provided on the pad for the bearing plate 32 longitudinally of the same in an area overlying the outermost edges of the rail flange 24 between the screws or bolts 40.

Referring now to FIGURE 6, a modified form of supporting structure is provided for the rail 12. In FIGURE 6, the supporting structure for the rail is a concrete base 46 upon which the pads 10 are directly positioned. Lag screws or bolts 40 extending through the bearing plates 32, holes 26 in pad 10 and into threaded holes provided in the concrete base 46 retain the rail 12 in position. In such an installation, the pads 10 are provided on sixteen inch centers longitudinally of the rail 12 so that the rail 12 is supported above the concrete base 46. In this installation, just as in the installation described with respect to FIGURE 3, it will be noted that the bearing plates 32, lag screws or bolts 40 are completely insulated from the base flange 24 of rail 12, and consequently, there can be no current flashover to the lag screws 40 or bearing plates 32. The rail base flange 24 is supported above the concrete base 46 by the thickness of the pad beneath the flange. For normal electrical railway use, it has been found that a ¾ inch or greater thickness of rubber beneath the flange of the rail is sufficient to insulate the rail from the concrete and also to elastically absorb the shock, impact and vibration caused by rolling stock.

FIGURE 7 illustrates a modification of the track structure disclosed in FIGURE 6. In this installation, the supporting structure 46 of concrete is provided with bolts 40' extending upwardly on appropriate centers. The bolts 40' may be embedded in the concrete base 46 when the concrete is poured. In such an installation, the pads 10 are slipped over the upwardly extending bolts 40' and then the rail 12 is positioned with its base flange 24 in the rail receiving cavity of the pad. A nut 50 is threaded onto the upper end of each bolt 40', the nut 50 bearing against the bearing plate 32. A suitable lock washer 52 may be provided between the nut and the bearing plate 32 if so desired.

FIGURE 8 illustrates still another supporting structure. In FIGURE 8, the numeral 54 represents a steel decking such as found on bridges, tunnels, rail crossings, electronic scales and the like. Suitable holes 56 are provided through the steel decking 54 in complementary spaced position to the holes 26 of the pads 10. A bolt 40" extending through the decking 54, pad 26 and bearing plate 32 is utilized to retain the rail 12 in position. A nut 50' threaded onto the upper end of the bolt 40" securely locks the rail in position in the manner described with respect to FIGURE 7. While FIGURE 8 has been illustrated with the bolts 40" extending upwardly through the steel decking 54, it will, of course, be understood that it is within the scope of the present invention to reverse the bolts and extend the same downwardly through the pad 10 and steel decking 54 so that the bolt heads bear against the bearing plates 32. In such an instance, the nuts will be threaded onto the lower ends of the bolts.

The bottom of the groove 18 upon which the flange 24 of rail 12 bears, may be tilted or canted, as indicated at C in FIGURE 5. As described in my aforementioned Patent 2,094,279, by providing a tilted or canted seat to the pad, the normal lateral thrust of the rail and the spreading of the rails caused by the rolling stock is resisted. The cant may be ranged from one inch in twenty inches to one inch in forty inches depending upon whether or not the track is to be positioned on a curve or is straight.

Figure 10:
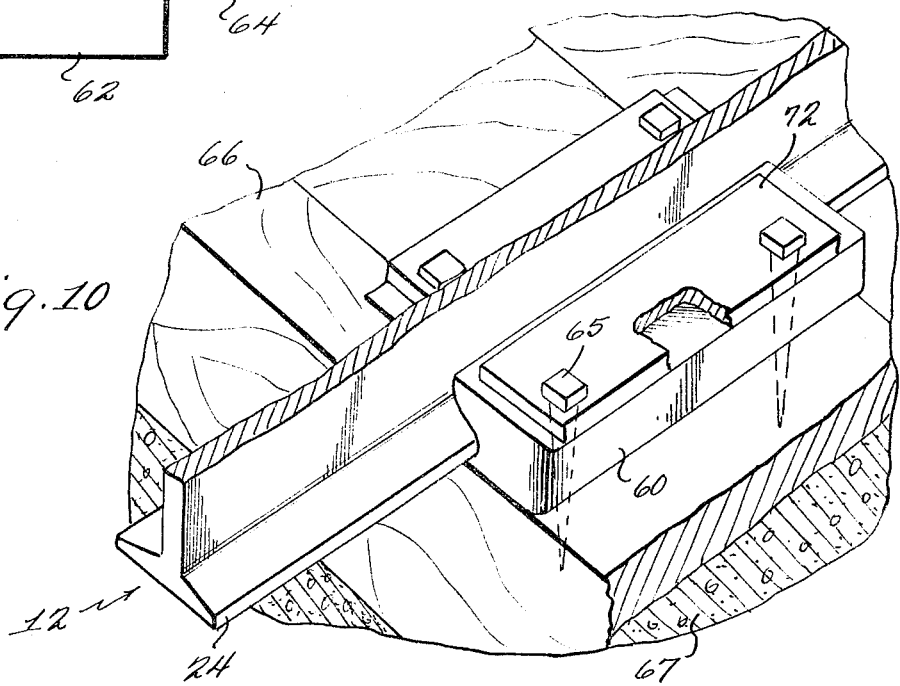
FIGURE 10 is a perspective similar to FIGURE 3 and partly in section illustrating the trail seat embodiment of FIGURE 9 utilized with a track-supporting structure including a wooden tie.

Turning now to the embodiment shown in FIGURES 9 and 10, the rail seat pad 60, with the exception of the undercut portion 61 for receiving the rail base flange and the bolt receiving holes 63, may be completely solid, having no recess for the bearing plate and no bevel portion. As shown in FIGURE 9, the pad 60 may be secured to a steel decking 74 as in the embodiment of FIGURE 8, or may be secured by means of a bolt 62 passing through the opening 63 to a concrete supporting structure as in FIGURE 7, or by means of a screw spike 65 may be secured to a wooden tie as in FIGURE 6, or to a wooden tie 66 and concrete supporting structure 64 as shown in FIGURE 10. Also, as with the embodiments shown in FIGURES 7 and 8, when employing a nut and bolt, a suitable washer or lock washer may be included as desired.

As with all previous embodiments, it is desired that the bearing plate 72 extends over the bolt receiving holes, and has holes therethrough which are aligned with the holes 63 in the pad 60. Moreover, as with previous embodiments, the bearing plate 72 overlies at least a portion of the rail base flange receiving cavity 61 in the pad 60, and at least a portion of the flange 24, to provide increased pressure area and evenly distribute the pressure of the bolts 62 or screw spikes 65 throughout the pad 60 to prevent possible localized wear and possible pad failure after continued use. As with previous embodiments, the rectangular shape of the bearing plate by coaction with the securing means 62 or 65 provides a substantially straight, continuous line of pressure on the lip portion 67 overlying the rail base flange and through such lip portion onto the rail base flange 24.

According to the improvement of this embodiment, the pad 60 may be formed from a 70/30 blend of natural rubber and neoprene to provide high dielectric strength. It has also been found however, that a butyl rubber may be used with desirable insulating effects. Butyl rubber also offers the advantage of excellent ozone protection. Where requirements are less stringent, the rail seat pad herein may be manufactured from natural rubber, synthetic rubber, or a combination of both, compounded to have a high dielectric strength or not, as desired, depending on the particular location and intended conditions of use. Also according to the improvement of this embodiment, the bearing plate 72 may be formed from steel, urethane, fiber composition, or any other suitable material. The non-ferrous materials are sometimes more desirable where very high dielectric strength is required.

The bearing plate 72 may be of the size previously shown for bearing plate 32, but is preferably of substantially the same length and width as each lip 67 of the pad 60. This feature provides greater stability and assembly strength and increases the restraining power on the rail against creeping. As an added advantage, if the lip portion 67 is also widened, this will tone down the wheel and rail noise since it has been found that the higher the lip 67 goes on the rail base flange 24, and the tighter the lip is held thereagainst by the bearing plate 72, the greater will be the noise reduction. This is very important in high speed transit systems for metropolitan areas.

In the further modification of FIGURE 11, the pad 80, like the embodiment of FIGURES 9 and 10, has no recess for the bearing plate, but according to a further embodiment of the invention, the pad 80 is provided with a central bevel portion 82, similar to the bevel portion 42 shown in FIGURE 5, for the purpose of economy, to save material, and to facilitate placement of the bearing plate upon the rail seat pad. Also, this bevel portion 82, terminating at D, is sometimes desirable as with the embodiment of FIGURE 5, as it eliminates a portion of material under the bearing plate and thereby assures the transfer of equal holding pressure from the securing means or bolts 85 through the entire length of the bearing plate 72 to provide a straight and continuous line of pressure in a highly even and uniform fashion on the rail base flange 24.

It will thus be seen that the objects and advantages of this invention have been fully and effectively accomplished by the structure illustrated in the drawings and described hereinbefore. However, the foregoing specific embodiments of the invention are subject to some changes without departing from the principles involved. For this reason, the terminology used in this specification is for the purpose of description and not limitation, the scope of the invention being defined in the claims.

What is claimed is:

1. A rail seat for supporting a traction rail on a supporting structure comprising a preformed resilient pad formed of an elastomeric material having a primary ingredient of natural rubber, said paid having in its top face a longitudinally extending groove with undercut edges defining a rail base flange receiving cavity and an outer longitudinal marginal edge portion on each of said longitudinally extending groove, said rail base flange receiving cavity having a transverse cross-sectional shape complementary to the rail base flange and a vertical height at any point as great as the thickness of the rail flange at that point whereby the portion of the pad adjacent the undercut edges of the groove of said pad is in a completely relaxed position when the rail flange is received in the cavity, said paid having a pair of longitudinally spaced prepunched holes through each of the outer longitudinal marginal edge portions thereof spaced outwardly from the longitudinal edges of the rail base flange receiving cavity in its region of greatest width by at least ⅜ of an inch, and said pad having an elongated recess on the upper face of each of the longitudinal marginal edge portions thereof spaced from the longitudinal edge of the groove in the upper face of the pad, each of said recesses on the upper face of each marginal edge portion of said pad extending over the pair of holes in the marginal edge portion, and over the inner longitudinally extending undercut edge of said flange-receiving cavity and each recess having an inner longitudinally extending edge parallel to the adjacent innermost longitudinal edge of said groove, said recesses providing an elongated bearing surface of a bearing plate received therein.

2. A rail seat of the character described in claim 1 wherein said pad has a secondary ingredient of neoprene.

3. A rail seat of the character described in claim 1 wherein said pad has a secondary ingredient of neoprene, there being approximately 70% of the primary ingredient of natural rubber to 30% of the secondary ingredient of neoprene.

4. A rail seat for supporting a traction rail on a supporting structure comprising a preformed resilient pad formed of an elastomeric material having a primary ingredient of natural rubber, said pad having in its top face a longitudinally extending groove with undercut edges defining a rail base flange receiving cavity, said rail base flange receiving cavity having a transverse cross-sectional shape complementary to the rail base flange, said pad having at least a pair of prepunched holes through each outer longitudinal marginal edge portion thereof, each pair of prepunched holes being spaced transversely outwardly of the longitudinal marginal edges of the rail base flange receiving cavity in its region of greatest width by at least ⅜ of an inch, a beveled portion in each of said longitudinal marginal edge portions of said pad positioned intermediate each pair of prepunched holes, and said pad having a recess portion in its top face of each longitudinal marginal edge portion, each recess extending over one of said pairs of prepunched holes and said beveled portion with an innermost longitudinal edge spaced from an edge of the groove in the top face of said pad, said longitudinal edge of each of said recesses being positioned over at least a portion of the rail flange-receiving cavity and said recesses having bearing surfaces spaced at least 3/16 of an inch above the top surface of the rail flange-receiving cavity, each of said recesses providing a bearing surface for a bearing plate received therein.

5. In combination: a traction rail having a base flange; a supporting structure for said traction rail; a preformed resilient pad between the traction rail and said supporting structure for supporting the traction rail on the supporting structure, said resilient pad being formed of an elastomeric material having a blend of natural rubber and neoprene; said pad having a rail base flange receiving cavity in its upper surface for receiving the base flange of said rail and a pair of outer marginal portions extending outwardly on each side of said cavity, the flange receiving cavity being defined by a pair of lips on said pad overlying the marginal portions of the base flange of said rail; said pad having at least a pair of longitudinally spaced prepunched holes in each of its outer marginal portions extending from the top surface through to the bottom surface thereof, said holes being spaced from the outer marginal edges of said rail base cavity in its region of greatest width of at least ⅜ of an inch; said pad having a recess in the top surface of each of the outer marginal edge portions of said pad and overlying the pair of longitudinally spaced holes and a portion of the lips and a portion of the rail base flange-receiving cavity; an elongated bearing plate in each recess, each bearing plate having a plan configuration complementary to the plan configuration of the recess and having a thickness equal to the depth of the recess whereby the bearing plate is flush with the top surface of said pad, said bearing plate having a pair of longitudinally spaced holes therein aligned with the pair of holes in the marginal edge portion of the pad; and means to anchor said rail to said supporting structure including bolt means extending through each of the aligned holes of said bearing plate and holes in said pad, said bolt means bearing against said bearing plates and being anchored to said supporting structure.

6. The combination of claim 5 wherein said blend of natural rubber and neoprene is approximately 70% of natural rubber to 30% of neoprene.

7. The combination defined in claim 5 wherein said bolt means includes lag screw elements threaded into said supporting structure.

8. A combination of claim 5 wherein said bolt means includes bolt elements having nuts threaded on one end thereof whereby said supporting structure, pad and bearing plate are secured together and retain said rail on said supporting structure.

9. The combination of claim 5 wherein the rail base flange receiving cavity of said pad is complementary in shape and has cross-section dimensions at least as great as the cross-section dimensions of said rail base flange whereby the lips and marginal edge portions of said pad are in completely relaxed position when the flange is received in the cavity of the pad.

10. The combination of claim 5 including a beveled portion in each of the longitudinal marginal edge portions of said pad positioned intermediate each pair of prepunched holes, each of said beveled portions having an innermost longitudinal edge spaced from and outwardly of the inner longitudinally extending edge of the respective recess whereby the bearing surface for said bearing plate as defined by the upper surface of said recess lies substantially over the outer marginal edges of the rail base cavity.

11. In combination: a traction rail having a base flange; a supporting structure for said traction rail; a preformed resilient pad between the traction rail and said supporting structure for supporting the traction rail on the supporting structure; said resilient pad being formed from an elastomeric material having a primary ingredient of natural rubber; said pad having a rail base flange receiving cavity in its upper surface for receiving the base flange of said rail, the flange receiving cavity being defined by lips on said pad that overlie the marginal portions of the base flange of said rail; a bearing plate positioned on each of said lips and overlying a portion of the rail base flange and the marginal outer edge portion of said pad, each bearing plate having its inner edge spaced outwardly of the innermost edge of the lip on which it is positioned; and means to anchor said rail to said supporting structure including bolt means extending through each of said bearing plates and said pad in spaced relationship to the outer extremities of said cavity in its region of greatest width, said bolt means bearing against said bearing plate and being anchored to said supporting structure, said bearing plate applying a continuous line of pressure on said rail base flange.

12. The combination of claim 11 wherein said pad is provided with an elongated bearing plate recess in the upper surface of each of the lips thereof and overlying a portion of the rail base flange receiving cavity such that each bearing plate lies substantially flush with the upper surface of said pad.

13. The combination of claim 11 wherein the upper surface of each of the lips of said pad is substantially planar and each bearing plate lies upon and rises above the corresponding upper lip surface.

14. The combination of claim 11 wherein said pad is provided with a beveled portion substantially intermediate each marginal outer edge portion thereof.

15. The combination of claim 11 wherein said pad is provided with a pair of longitudinally spaced prepunched bolt means receiving holes through each of the marginal outer edge portions thereof spaced outwardly from the marginal portions of the rail base flange receiving cavity, said holes having a diameter slightly smaller than the diameter of the bolt means such that the holes are extended by said bolt means and exert a positive pressure thereon.

16. The combination of claim 11 wherein each bearing plate is substantially as large as the surface of the lip on which it is received.

17. The combination of claim 11 wherein the bearing plate is formed of a nonferrous material.

18. The rail seat of claim 11 wherein said pad is provided with an elongated bearing plate receiving recess in the upper surface of each of the lips thereof and overlying a portion of the rail base flange receiving cavity.

19. The rail seat of claim 11 wherein the upper surface of each of the lips of said pad is substantially planar and solid.

20. The rail seat of claim 11 wherein said pad is provided with a beveled portion substantially intermediate each marginal outer edge portion thereof.

21. The combination of claim 11 wherein the elastomeric material has high dielectric strength and is capable of insulating the traction rail from the supporting structure.

References Cited by the Examiner

UNITED STATES PATENTS

| | | | |
|---|---|---|---|
| 2,094,279 | 9/1937 | Moses | 238—283 |
| 2,162,599 | 2/1939 | Austin et al. | 238—283 |
| 2,257,923 | 10/1941 | Verplanck | 238—283 |

OTHER REFERENCES

"Track Handbook," published by Railroad Rubber Products, Inc., copyright 1954, received by U.S. Patent Office, November 29, 1957. Pages relied on: page 3, section VII; page 5, section IV.

ARTHUR L. LA POINT, *Primary Examiner.*

EUGENE G. BOTZ, *Examiner.*

R. A. BERTSCH, *Assistant Examiner.*